April 3, 1962 K. C. HURLEY 3,028,445
ROTARY ELECTRICAL JOINT

Filed May 21, 1959 3 Sheets-Sheet 1

INVENTOR.
KARL C. HURLEY,
BY
AGENT.

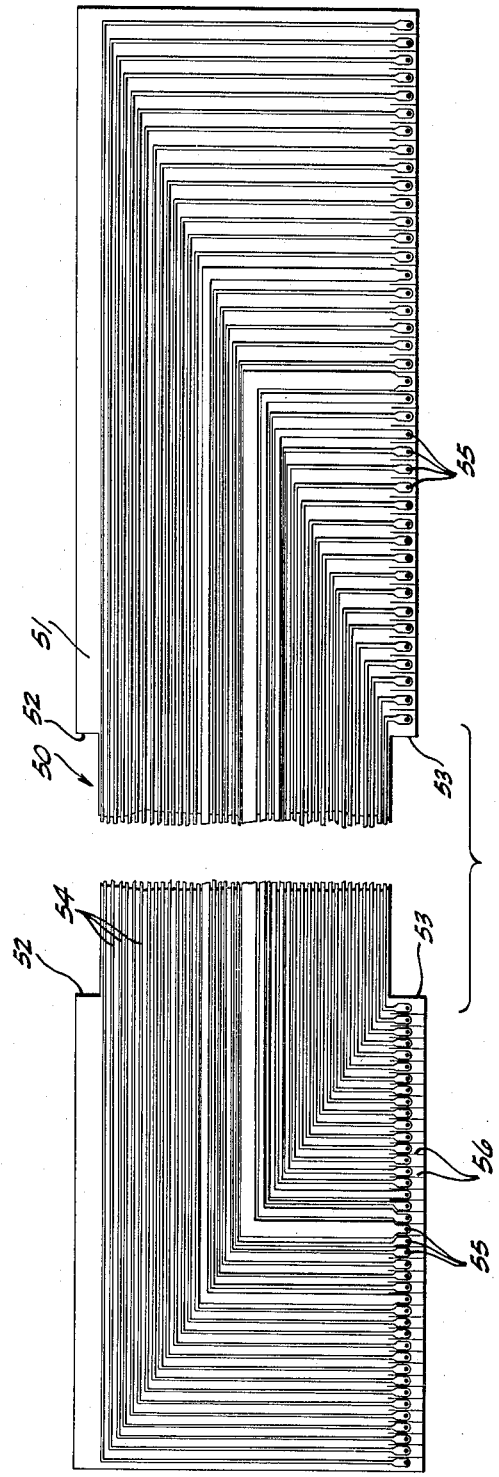

April 3, 1962  K. C. HURLEY  3,028,445
ROTARY ELECTRICAL JOINT
Filed May 21, 1959  3 Sheets-Sheet 3
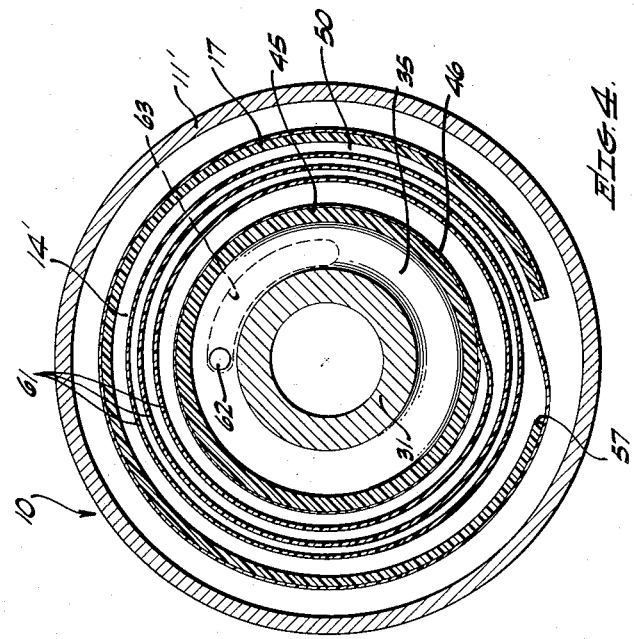
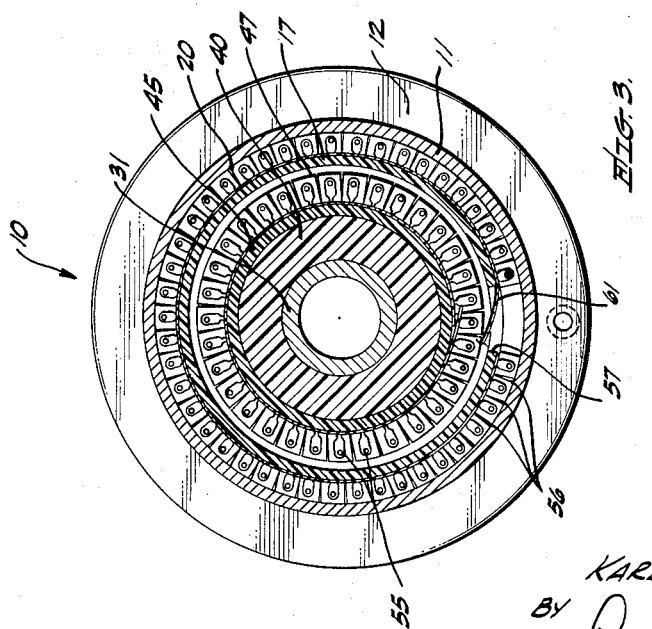
INVENTOR.
KARL C. HURLEY,
BY
AGENT.

United States Patent Office 3,028,445
Patented Apr. 3, 1962

3,028,445
ROTARY ELECTRICAL JOINT
Karl C. Hurley, Los Angeles, Calif., assignor to Hughes Aircraft Company, Culver City, Calif., a corporation of Delaware
Filed May 21, 1959, Ser. No. 814,929
4 Claims. (Cl. 174—86)

This invention relates generally to an electrical conductor and relates more specifically to a flexible electrical conductor adapted primarily for use in connection with, and as a portion of, a rotary type electrical joint.

Heretofore, many electrical structures have required the connection of one or more electrical conductors across a rotary or moving element or between two or more relatively movable elements. In some of these prior instances, a considerable number of connections were necessary between such relatively movable elements and it has been necessary to resort to various known structures such as slip rings, a coiled cable or a plurality of wound conductors. The slip ring arrangements employ brushes or other sliding members that operate in conjunction with rotating conducting rings. Such structures have proven to be unsatisfactory in many instances due to the presence of excessive noise contact chatter and open circuit characteristics, corrosion of the contacting elements and the large number of parts that are involved, thus making assemblies of this type relatively expensive. Additionally, these devices have been subject to excessive wear and must be maintained during their entire life.

The coiled cable structures used heretofore have been in the form of a cable having the prescribed number of conductors helically wound and arranged to permit oscillation through a required angle. The coiled cable has a major disadvantage in connection with the stress concentrations in a cable wound in this form, which may result in conductor breakage and also an unreliable end product. The wound type of conductors have been in the form of an assembly containing a series of conductors spirally wound on a stationary mandrel and connected at the outer end thereof to an oscillating member. In this type of construction, a large number of components are involved which not only constitute an expensive assembly but the bonded joints utilized therein tend to provide an unreliable product.

The flexible conductor arrangement of this invention is, generally, a ribbon cable, of a plastic material or the like, with conductors formed thereon in the desired configuration as through the application of etched or printed circuitry techniques. The flexible conductor or ribbon cable is molded or otherwise bonded to conform to the shape of a pair of concentrically arranged cylinders, with the cable becoming an integral part of these cylinders and disposed through a number of spirally arranged convolutions therebetween. The cable contains a number of terminals that are adapted for connection to studs or terminal members carried by the cylinders in such a manner that the cylinders may be rotated through a limited angle, this angle depending largely upon the number of free spiral coils of the cable between the cylinders.

It is therefore one important object of the present invention to provide a novel flexible conductor.

It is another object of the invention to provide a flexible conductor arrangement employing a flexible ribbon cable disposed between a pair of relatively rotatable, concentrically arranged cylinder members.

A further object of the invention is to provide a rotary electrical joint that is simple in construction, reliable and effective in use and relatively inexpensive.

Still another object of the invention is to provide a rotary electrical joint wherein no sliding electrical contacts are employed and which may be used in instances requiring limited rotary movement as between a pair of relatively rotatable members.

Other and further important objects of the invention will become apparent from the disclosures of the following detailed specification, appended claims and accompanying drawings, wherein:

FIG. 2 is an extended plan view of a typical ribbon cable that may be employed with the present rotary electrical joint;

FIG. 3 is a transverse sectional view through a portion of the rotary joint, as taken substantially as indicated by line 3—3, FIG. 1; and FIG. 4 is an enlarged transverse sectional view showing other elements of the construction of the present electrical joint, as taken substantially as indicated by line 4—4, FIG. 1.

Figure 1:
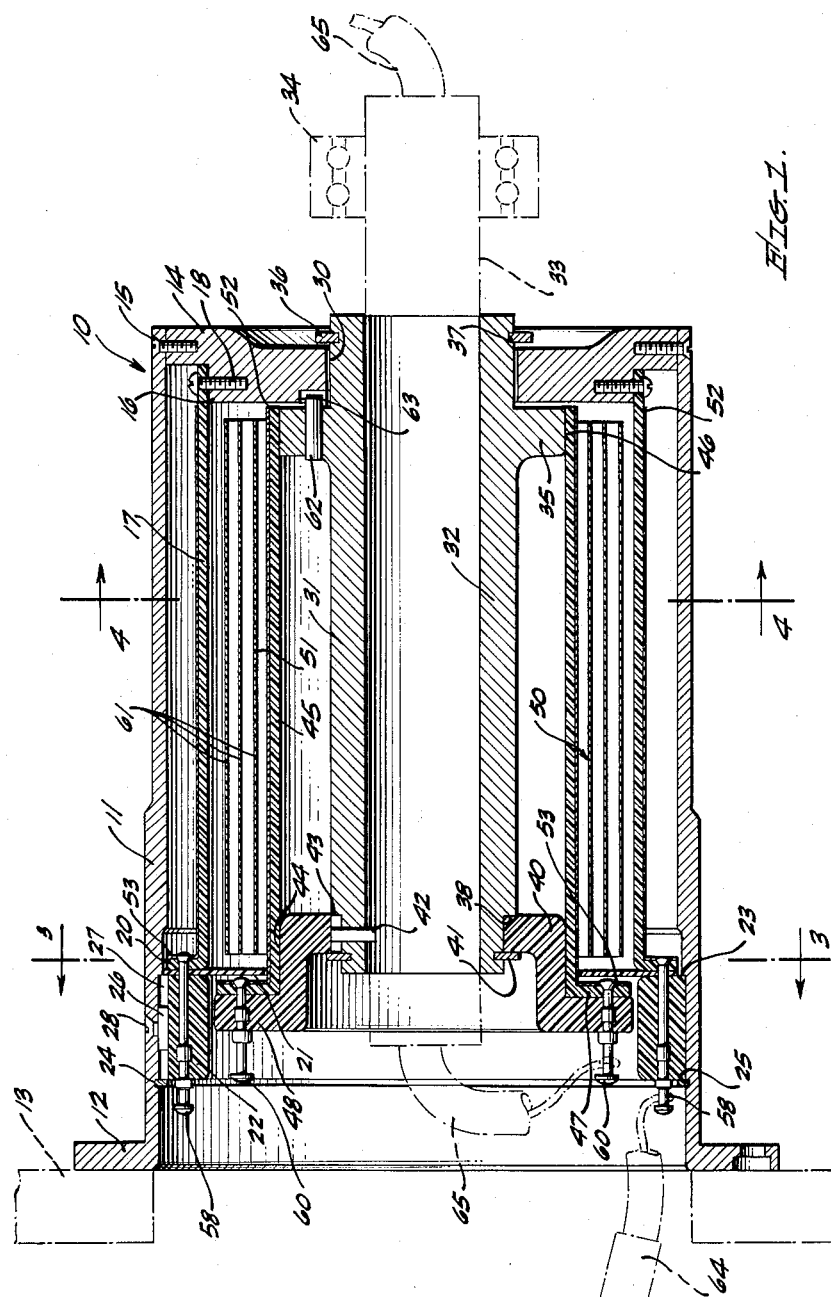
FIGURE 1 is a longitudinal, sectional view of the rotary joint of the present invention.

With reference to the drawing, and with reference primarily to FIG. 1, the rotary electrical joint hereof is shown as indicated general at 10. The joint includes an outer cylindrical housing 11 which may be flanged as at 12 for connection to any suitable stationary structure indicated at 13. An end of the housing 11, remote from the flange 12, is adapted for reception of an end wall member 14 that is secured to the housing by means of suitable screws 15. The end wall 14 has an annular shoulder 16 to which an outer cylinder 17 is secured as by screws 18. The cylinder 17 is constructed from a nonconductive material, disposed concentrically within the annular housing 11 and spaced radially inwardly therefrom. The end of the cylinder 17, remote from the wall 14, is provided with a radially outwardly extending flange 20 which bears axially against a shim or shield member 21 of nonconductive material. The shim 21 is annular in configuration and also axially engages a nonelectrically conductive ring 22 that is, in turn, held in position against a shoulder 23, formed on an inner surface of the housing 11, by means of a snap ring 24 that is disposed in a suitable groove 25 in the housing 11. A key 26, disposed in a longitudinal groove 27 in the outer surface of the ring 22 and retained in position by means of a screw 28 carried by the housing 11, serves to prevent rotation of the ring 22 relative to the housing.

As shown primarily in FIG. 1, the end wall 14 is provided with a central opening 30 therein. A longitudinally extending central cylindrical support member 31 has one end that is adapted for disposition within the opening 30, the outer annular surface thereof being spaced from the annular surface of the opening 30. The member 31 has a bore 32 therethrough and is adapted for disposition on a shaft indicated by the dotted lines at 33, which may in turn be supported on a suitable bearing 34, whereby to maintain the alignment between the member 31 and the balance of the mechanism, together with the spacing between the opening 30 and the outer surface of the member 31. The member 31 is provided with a radially outwardly extending flange 35 that is disposed adjacent an inner radially extending surface of the end wall 14. A snap ring 36, carried in a groove 37 in an outer end of the member 31, is disposed adjacent an outer surface of the end wall 14. It is to be noted that the adjacent surfaces of the flange 35 and the snap ring 36 are spaced from the respective adjacent surfaces of the end wall 14. The end of the member 31, remote from the end wall 14, is provided with a shoulder 38 and a reduced diameter portion which serves to support a flange member 40. The flange member 40 is constructed from a nonconductive material and retained in position by means of a snap ring 41 which engages an end of the member 31. The member 40 is retained against rotation relative to the member 31 by means of a pin 42 that is disposed radially through the wall of the member 31 and into a longitudinal groove 43 in the flange member 40.

The flange member 40 has a step portion defining an axially extending surface 44, an inner cylinder 45 of nonconductive material being disposed on the surface 44 and an outer surface 46 of the flange 35. The cylinder 45 has an integral flange 47 formed on one end thereof and disposed radially outwardly therefrom. The flange 47 is adapted to bear against an outer portion 48 of the flange member 40. An inner annular edge of the shim 21 is disposed in radially outwardly spaced relationship to an outer surface of the cylinder 45 and axially closely adjacent to the flange 47 of the inner cylinder 45.

As shown next in FIG. 2 of the drawings, the ribbon cable employed herewith is indicated generally at 50. The cable 50 may be made from any suitable flexible material such as that commercially known as Teflon and reinforced with glass fibers, thus to form a base 51 of the desired configuration. In the present instance, the base 51 is an elongated sheet of material having laterally disposed extensions 52 along portions of one edge thereof and extension portions 53 along the other edge thereof. A plurality of electrical conductors 54, that may be of copper, are applied and bonded to at least one surface of the base 51 as by printed or etched circuit techniques. These conductors 54 may be of varying widths depending upon the current carrying capacities desired and extend longitudinally of the base 51 to terminate in end portions disposed at right angles to the longitudinal portions and in a plurality of terminal portions 55 that are disposed in longitudinally spaced relationship in the extension portions 53. The extension portions 53 are provided with a plurality of cuts 56 intermediate the terminal portions 55 of the conductors 54.

As shown in FIG. 4, the ribbon cable 50 is wound in a plurality of spirally arranged convolutions, the extension portions 53 being bent at right angles, with the cuts 56 permitting the terminal portions 55 of the conductors 54 to fan out. Through application of heat, as by disposition in an oven, the coiled ribbon cable is annealed and set in the desired coiled configuration and disposed about the outer surfaces of the cylinders 17 and 45 and in a radial space defined between the cylinders 17 and 45. One end of the ribbon cable extends through a longitudinal slot 57, FIG. 3, in the cylinder 17, whereby to permit disposition on the outer surface thereof. The extension portions 53, together with the terminal portions 55 of the conductors 54, are adapted for disposition in contact with radially extending surfaces of the flanges 20 and 47 respectively. A plurality of terminal studs 58 are disposed axially through the ring 22, the shim 21, the flange 20 of the cylinder 17 and the tabs defined between the cuts 56 and secured to the terminal portions 55 of the conductors 54. Similarly, a plurality of terminal studs 60 are disposed through the portion 48 of the flange member 40, the flange 47 of the cylinder 45 and the tabs defined between the cuts 56 of the other end portion extension 53 of the ribbon cable for application to additional terminal portions 55 of the conductors 54. It is to be noted that the convolutions of the ribbon cable, indicated at 61 in FIG. 1, are radially spaced and that the portions of the ribbon cable 50 overlying the surfaces of the cylinders 17 and 45 are bonded to the cylinders and to the respective flanges thereof to become an integral part of the cylinders. The coiled portions 61 of the ribbon cable 50 thus permits relative rotation of the cylinders 17 and 45 without surface contact between portions of the conductors 54. The amount of rotary relative movement of the cylinders 17 and 45 is limited by means of a pin 62 disposed axially from the flange 35 of the member 31 and positioned within an arcuate groove 63 formed in the inner surface of the end wall 14.

As shown in FIG. 1, the terminal studs 58 are adapted for connection to a suitable electrical harness 64, while the terminal stud 60 may be connected to another electrical harness 65. The harness 64 may extend to a suitable fixed structure while the harness 65 may extend through the supporting shaft structure 33 and to a movable structure to which electrical energy must be conducted. It may thus be seen that electrical energy may be conducted from the harness 64 to the harness 65 through the present rotary joint without the necessity for use of slip rings or similar structures and in a manner permitting reliability of the end product and a relatively small amount of service or maintenance. The cylinders 17 and 45 may be relatively moved through many oscillations, with the amount of bending of any one portion of the ribbon cable being relatively small, whereas to reduce the possibilities of stress concentrations, and failure of either the base material 51 or the conductors 54, to a minimum. Furthermore, the relatively small number of parts herein enables a unit that is inexpensive in manufacture and which may be adapted to mass production techniques. Even though the terminal studs 58 and 61 are attached by means of soldered joints to the terminal portions 55 of the conductors 54, there is no relative movement within these joints and, accordingly, little or no possibility of fracture thereof. Additionally, due to the pre-established and set configuration of the ribbon cable and the free spacing between relatively movable components of the present electrical joint, extremely low frictional components are inherent herein.

While the device hereof has been shown as including a pair of concentrically disposed cylinders, with the tape cable secured to outer surfaces thereof, it is to be understood that the cable may be secured to inner surfaces of the cylinders or outer and inner surfaces thereof. Additionally, the apparatus hereof may be modified in a manner permitting rotation of both the cylinders 17 and 45 and, by particular design of the ribbon cable, there may be more than two cylinders without departing from the spirit and scope of this invention. Also, by varying the length and diameter of the assembly and/or the width or thickness of the etched conductors, more or less conductors of varying current carrying capacities may be employed. The flanged construction of the extension portions 53 may also be eliminated and the ribbon tape cable attached to a terminal ring having terminals disposed at right angles to the axis of the assembly. In this instance, the terminals may extend radially from a cylindrical terminal ring, thus permitting the ribbon cable to be attached to the cylinders without the use of the flanges 20 and 47.

Having thus described the invention and the present embodiment thereof, it is further desired to emphasize the fact that many modifications, including those outlined hereinbefore, may be resorted to in a manner limited only by a just interpretation of the following claims.

I claim:

1. In a rotary electrical joint, the combination of: a pair of elongated cylinders; means for independently supporting said cylinders concentrically with each other and in radially spaced relationship, at least one of said cylinders being rotatably supported; a spirally preformed flexible ribbon cable, said cable having a plurality of spaced conductors bonded thereto, said conductors terminating in terminal portions; end portions on said cable, said end portions being bonded to exterior surfaces of said cylinders, an intermediate portion of said cable being spirally disposed with a plurality of revolutions thereof concentrically between said cylinders; radially outwardly disposed flanges on common ends of each of said cylinders, said terminal portions of said conductors and supporting portions of said cable being disposed normal to said surfaces of said cylinders and in contact with said flanges; and a plurality of terminal studs carried by said cylinders, said studs being individually secured to each of said terminal portions.

2. In a rotary electrical joint, the combination of: a pair of elongated cylinders; means for independently supporting said cylinders concentrically with each other and in radially spaced relationship, at least one of said cylinders being rotatably supported; a spirally preformed flexible ribbon cable, said cable having a plurality of spaced conductors bonded thereto, said conductors terminating in terminal portions; end portions on said cable, said end portions being bonded to exterior surfaces of said cylinders, an intermediate portion of said cable being spirally disposed with a plurality of revolutions thereof concentrically between said cylinders; radially outwardly disposed flanges on common ends of each of said cylinders, said terminal portions of said conductors and supporting portions of said cable being disposed normal to said surfaces of said cylinders and in contact with said flanges; a plurality of terminal studs carried by said cylinders, said studs being individually secured to each of said terminal portions; and means for limiting relative rotation of said cylinders.

3. In a rotary electrical joint, the combination of: an elongated cylindrical housing, said housing being adapted for attachment to a fixed structure; an end wall in said housing and secured thereto; a ring disposed in said housing adjacent another end thereof; an elongated outer cylinder having a radially outwardly flanged end, said cylinder being secured to said end wall, said flanged end being disposed in cooperation with said ring; a central rotary element disposed within said end wall and spaced therefrom, said rotary element being adapted for support on a rotatable member; an angle member carried by said rotary element and positioned concentric with said ring; a flange on said rotary element; an elongated inner cylinder disposed between said angle member and said flange on said rotary element, said rotary element, said inner and outer cylinders and said housing being concentrically positioned, said inner cylinder being spaced radially from said outer cylinder, said inner cylinder having a radially outwardly disposed flanged end positioned in cooperation with said angle member; a spirally preformed flexible ribbon cable, said cable having a plurality of spaced conductors bonded thereto, said conductors terminating in terminal portions; end portion on said cable, said end portions being bonded to respective exterior surfaces of said inner and outer cylinders, an intermediate portion of said cable being spirally disposed with a plurality of revolutions thereof concentrically within said space defined between said cylinders, said terminal portions of said conductors and supporting portions of said cable being disposed normal to said surfaces of said cylinders and in contact with said flanges; a plurality of terminal studs disposed respectively and individually through said ring and said angle member and connected to said conductor terminal portions, electrical harnesses benig adapted for connection to said terminal studs; and means for limiting rotary movement of said inner cylinder.

4. In a rotary electrical joint, the combination of: an elongated cylindrical housing, said housing being adapted for attachment to a fixed structure; an end wall in said housing and secured thereto; a nonconductive ring disposed in said housing adjacent another end thereof; an elongated outer cylinder having a radially outwardly flanged end, said cylinder being secured to said end wall, said flanged end being disposed in cooperation with said ring; a central rotary element disposed within said end wall and spaced therefrom, said rotary element being adapted for support on a rotatable member; a nonconductive angle member carried by said rotary element and positioned concentric with said ring; a flange on said rotary element; an elongated inner cylinder disposed between said angle member and said flange on said rotary element, said rotary element, said inner and outer cylinders and said housing being concentrically positioned, said inner cylinder being spaced radially from said outer cylinder, said inner cylinder having a radially outwardly disposed flanged end positioned in cooperation with said angle member; a spirally preformed flexible ribbon cable, said cable having a plurality of spaced conductors bonded thereto, said conductors terminating in terminal portions; end portions on said cable, said end portions being bonded to respective exterior surfaces of said inner and outer cylinders, an intermediate portion of said cable being spirally disposed with a plurality of revolutions thereof concentrically within said space defined between said cylinders, said terminal portions of said conductors and supporting portions of said cable being disposed normal to said surfaces of said cylinders and in contact with said flanges; a plurality of terminal studs disposed respectively and individually in an axial direction through said ring and said angle member and connected to said conductor terminal portions, electrical harnesses being adapted for connection to said terminal studs; and a pin carried by said rotary element and adapted for cooperation with an arcuate slot in said end wall whereby to limit an angle of rotation of said rotary element angle member and inner cylinder.

References Cited in the file of this patent
UNITED STATES PATENTS

| | | |
|---|---|---|
| 890,988 | Kitsee | June 16, 1908 |
| 2,052,069 | Arras | Aug. 25, 1936 |

FOREIGN PATENTS

| | | |
|---|---|---|
| 856,982 | France | Apr. 8, 1940 |
| 972,006 | France | Aug. 23, 1950 |
| 751,684 | Germany | Feb. 2, 1955 |

OTHER REFERENCES

Publication I: "Flexible Cables," published in Electronics, Dec. 1955. (Page 313 relied on.)